Aug. 7, 1962   A. C. SCINTA   3,047,900
WIPER ARM
Filed May 9, 1958
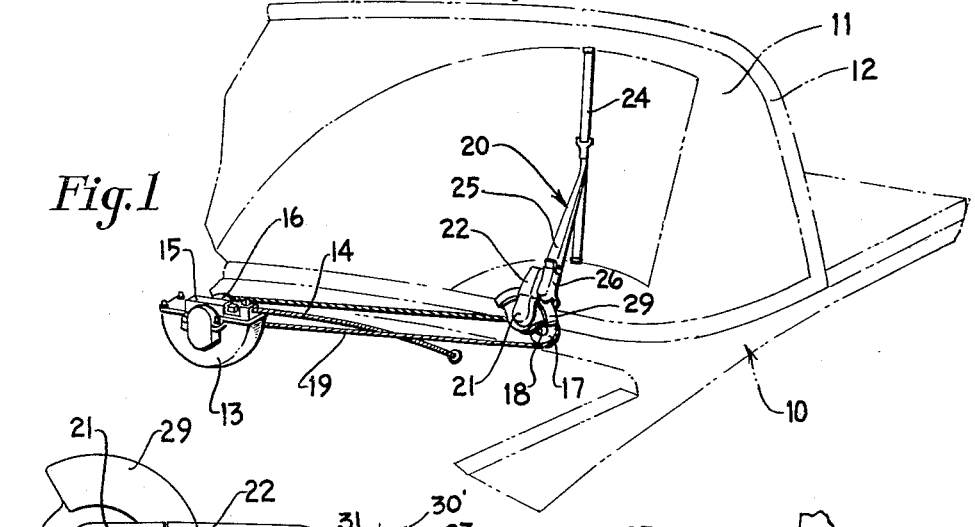
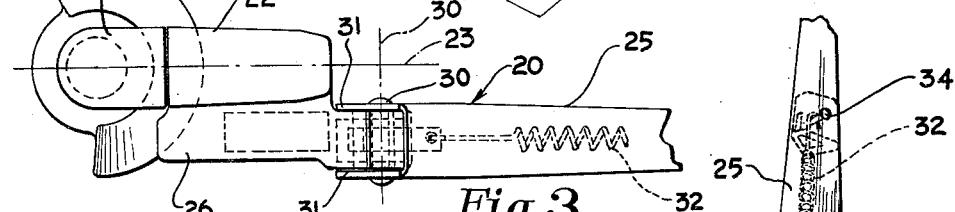
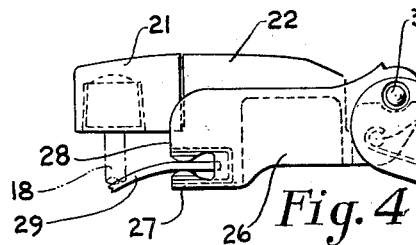
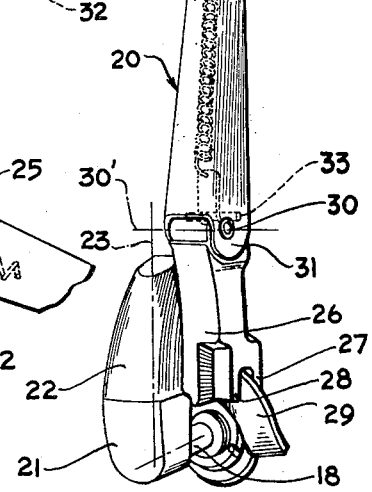
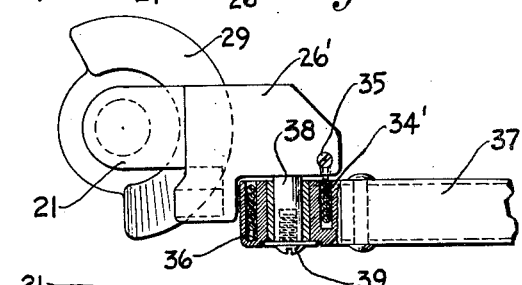
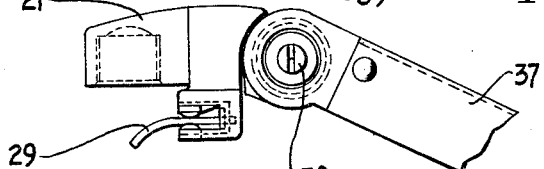
INVENTOR.
ANTHONY C. SCINTA
BY
Bean Brooks Buckley + Bean
ATTORNEYS

3,047,900
WIPER ARM
Anthony C. Scinta, Hamburg, N.Y., assignor to Trico Products Corporation, Buffalo, N.Y.
Filed May 9, 1958, Ser. No. 734,350
7 Claims. (Cl. 15—250.21)

This invention relates to windshield cleaning apparatus, and more particularly to a wiper arm arrangement for more efficiently cleaning curved windshields of the wraparound type.

The present invention constitutes an improvement over a windshield wiper arm construction of the type disclosed in U.S. Patent No. 2,781,540 wherein a windshield wiper arm is adapted to pivot generally about its longitudinal axis as it traverses a windshield in order to maintain the blade carried thereby substantially normal to portions of the windshield having various radii of curvature. This action is necessary in order to produce a relatively efficient wiping of the windshield and to prevent the metal backing plate which carries the wiper blade from scoring the windshield. However, in a construction of this type, the base portion of the arm which is mounted on an oscillating rockshaft is not free to travel an appreciable distance toward and away from the windshield. Therefore, in following the windshield, the upper portion of the wiper arm tends to drop as it reaches the side portions of the windshield with the attendant decreasing of the tension on the spring which produces the arm pressure. It is with overcoming the foregoing shortcoming of the prior art that the present invention is concerned.

It is accordingly an important object of the present invention to provide a windshield wiper arm construction which causes the arm to maintain a constant pressure on a wiper which travels through an arc of a windshield having various radii of curvature, thereby providing improved wiper operation and minimizing the tendency of the wiper to be subject to wind-lift.

It is another object of the present invention to provide a windshield wiper arm construction which not only, in an improved manner, maintains the wiper blade in an optimum wiping position substantially normal to the windshield as it traverses portions thereof having various radii of curvature, but which also tends to maintain the pressure on the wiper substantially constant throughout its path of travel.

Another object of the present invention is to provide a windshield wiper arm construction wherein the wiper arm is capable of following the contour of the curved windshield in a more precise and gradual manner, thereby producing a highly efficient wiping action. Other objects and attendant advantages of the present invention will readily be perceived hereafter.

The present invention relates to a windshield wiper arm construction wherein a cam arrangement associated therewith causes the axis of the wiper arm, throughout its path of travel, to be maintained substantially at the same general inclination relative to a windshield having various radii of curvature. Accordingly, the tension on the spring which supplies the desired wiping pressure is also maintained relatively constant. The construction is such that most of the portions of the longitudinal axis of the wiper arm tend to remain at a relatively constant distance from the windshield because a base portion of the wiper arm follows the contour of the windshield. This movement of the wiper arm is accomplished in a relatively smooth manner thereby providing improved wiper operation. The present invention will be more fully understood when the following portions of the specification are read in conjunction with the accompanying drawings wherein:

FIG. 1 is a fragmentary perspective view of an automotive vehicle mounting the improved wiper arm construction of the present invention;

FIG. 2 is a perspective view of a portion of the improved wiper arm construction on an enlarged scale;

FIG. 3 is a plan view of the construction of FIG. 2;

FIG. 4 is a side elevational view of the construction of FIG. 3;

FIG. 5 is a plan view, with portions in cross section of a modification of the structure of FIGS. 2, 3 and 4; and FIG. 6 is a side elevational view of the structure of FIG. 5.

Reference is now made to FIG. 1 wherein an automotive vehicle 10 is shown mounting a curved windshield 11 in a molding 12. Windshield 11 has a plurality of portions of different radii of curvature which are traversed by wiper 24. A wiper motor 13 is suitably mounted underneath the hood or the dashboard of the vehicle in the well-known manner. A cable 14 extends between a suitable control (not shown) on the dashboard and the slider valve portion 15 of motor 13. The manipulation of the control causes slider valve mechanism 15 to operate in the conventional manner to start or stop motor 13, as desired. A pulley 16, which is mounted on the oscillating shaft (not shown) of motor 13, is coupled by flexible cable 19 to pulley 17, which is fixedly mounted on a rockshaft 18. As is well known in the art, the oscillation of pulley 16 will cause corresponding oscillation of rockshaft 18 and wiper arm 20 attached thereto.

The improved construction of wiper arm 20 is shown in FIGS. 2, 3 and 4. This arm consists of a first, or base, portion 21 which is suitably mounted on rockshaft 18 for oscillation therewith, in a manner such as disclosed in U.S. Patent No. 2,781,540. Pivotally mounted on base portion 21 is a second portion 22 which is adapted to pivot about axis 23 during oscillation of the wiper blade 24. The pivotal mounting between members 21 and 22 may be of the same type disclosed in the above-mentioned patent and it is deemed that a detailed description of this structure is unnecessary for the purposes of the present invention, it being merely necessary to understand that member 22 is capable of pivoting relative to member 21. A third arm portion 25 is laterally offset from second arm portion 22 by connecting member 26, which is connected to second arm portion 22. Mounted on connecting member 26 at the lower portion thereof remote from axis 23 are arms 27 and 28. These arms carry cam followers (not numbered) which straddle cam 29 which, in turn, is suitably mounted against movement about rockshaft 18.

Cam 29 generally reflects the contour of the portions of the windshield which are traversed by wiper blade 24. Thus, as wiper arm 20 is oscillated back and forth across the portions of the windshield having different radii of curvature, one end of connecting member 26 and the lower portion of arm 25 connected thereto will follow cam 29. The lateral offset provided by member 26 permits a substantial amount of bodily movement of arm 25 to and from the windshield from a relatively small pivotal movement of member 22 about axis 23 because of the length of the lever arm provided by member 26. Furthermore, the end of member 26 which mounts arm 25 will move in a direction toward and away from the windshield without causing appreciable binding between cam 29 and the followers associated therewith because the cam followers are located at the end of the lever arm provided by member 26.

Arm portion 25 is pivotally mounted by pin 30 to the upper portion of member 26, pin 30 extending through aligned apertures (not shown) in depending ears 31 of arm portion 25 and a suitable aperture (not numbered) in the upper portion of member 26. A tension spring 32 extends between a pin 33, which is fixedly secured in member 26, and an anchor pin 34 (FIG. 2) which is mounted in arm portion 25. This spring causes arm portion 25 to exert the necessary pressure on wiper 24 to produce optimum wiping.

As described above, cam 29 and the associated cam follower arrangement cause the end of member 26 which is remote from axis 23 to move in a direction toward the windshield, thereby tending to maintain the wiper arm portion 25 at substantially the same relative inclination to the windshield which it possesses on the flatter portions thereof. Thus, it can be seen that since there is no appreciable change in tension of spring 32, a substantially constant pressure is exerted by arm 25 on wiper 24 throughout the entire path of travel of the wiper.

It is to be further noted that the axis of pin 30 which couples arm portion 25 to member 26 extends in a direction substantially perpendicular to and intersecting the axis 23 about which arm portion 22 pivots. This arrangement causes arm portion 25, throughout its travel, to more accurately maintain the attitude of wiper blade 24 substantially normal to the windshield.

A modified embodiment of the present invention is shown in FIGS. 5 and 6. The difference between this structure and that described above is that a torsion spring 34' is utilized instead of tension spring 32. As can be seen from FIG. 5, spring 34' has one portion thereof affixed as by screw 35 to member 26' and the other end thereof secured to a suitable abutment such as 36 within arm portion 37. A shaft 38 extending from member 26' mounts arm portion 37 and the assembly is suitably joined as by screw 39. The advantage of this type of construction is that it eliminates the necessity of having a tension spring such as 32 shown in FIGS. 2, 3 and 4, and therefore eliminates the necessity of having the other structure associated with the spring.

While I have described the preferred embodiment of the present invention I desire it to be understood that it is not limited thereto but may be otherwise embodied within the scope of the following claims.

I claim:

1. A windshield wiper arm construction comprising an arm portion having first and second parts, said first part adapted to be coupled to a rockshaft and said second part mounted on said first part for pivotal movement relative thereto, an extended elongated arm portion having its longitudinal axis extending substantially parallel to the axis of said pivotal movement and offset therefrom, and a member coupling said extended arm portion to said second part of said arm portion.

2. A windshield wiper arm construction comprising a first arm portion having first and second parts, a first pivotal connection providing a first pivotal axis for coupling said first and second parts, a second arm portion laterally offset from said first part of said first arm portion, and a second pivotal connection extending in a direction transverse to said first pivotal connection and joining said second arm portion to said second part of said first arm portion at a location which is laterally offset from said first pivotal connection.

3. A windshield wiper arm construction as set forth in claim 2 wherein the longitudinal axis of said second arm portion extends in a direction substantially parallel to said first axis of pivotal movement between said first and second parts of said first arm portion.

4. A windshield wiper arm as set forth in claim 3 wherein said second pivotal connection permits said second portion to move toward and away from a windshield, the axis of said second pivotal connection, when extended, generally intersecting the axis of pivotal movement between said first and second parts of said first portion.

5. In combination, a wiper adapted to oscillate across portions of a curved windshield, and a wiper arm construction adapted to mount said wiper, said wiper arm construction comprising a base portion adapted to be mounted on a rockshaft for oscillation, a first arm portion adapted to be pivotally mounted on said base portion for oscillation about an axis extending substantially perpendicularly to said rockshaft, a second arm portion having one end thereof adapted to be coupled to said windshield wiper and the other end thereof adapted to be located proximate said first arm portion, means coupling said second arm portion to said first arm portion in an offset manner, cam means mounted proximate said other end of said second arm portion, said cam means causing said other end of said second arm portion to move in a direction toward and away from the windshield during oscillation of said wiper to thereby maintain the inclination of said second arm portion relative to the windshield substantially constant throughout the path of travel thereof.

6. An arrangement for maintaining a windshield wiper substantially normal to portions of a curved windshield and for maintaining the wiper pressure substantially constant throughout the path of travel of the wiper, comprising a rockshaft, means for oscillating said rockshaft, a wiper, and an arm assembly for mounting said wiper, said arm assembly comprising a first arm portion secured to said rockshaft for oscillation therewith, a second arm portion, first pivot means coupling said first and second portions for permitting said second portion to pivot about an axis extending toward said rockshaft, a member extending laterally from said second arm portion, and a third arm portion adapted to be coupled at one end thereof to said windshield wiper, second pivot means extending transversely of said first pivot means for coupling the other end of said third arm portion to a portion of said laterally extending member which is laterally offset from said first pivot means, a cam mounted proximate said rockshaft, a cam follower coupled to said laterally extending member and operatively engaging said cam, and means mounted on said third arm portion for maintaining a predetermined tension thereon, said arm arrangement maintaining a substantially constant pressure between said wiper and said windshield and maintaining said wiper substantially normal to said windshield throughout the entire path of travel of said wiper.

7. A windshield wiper arm adapted to drive a wiper across a portion of a curved windshield, comprising a first arm portion adapted to be coupled to a rockshaft, a second arm portion adapted to pivot on said first arm portion about an axis extending through both said first and second arm portions, a third arm portion coupled to said second arm portion, said third arm portion being laterally offset from said first and second arm portions and said rockshaft, and means for maintaining said third arm portion at substantially the same relative inclination to the windshield substantially throughout the path of travel of said arm.

References Cited in the file of this patent

UNITED STATES PATENTS

| | | |
|---|---|---|
| 1,183,463 | Jepson | May 16, 1916 |
| 2,295,620 | Zaiger | Sept. 15, 1942 |
| 2,691,186 | Oishei et al. | Oct. 12, 1954 |
| 2,781,540 | Deibel | Feb. 19, 1957 |
| 2,824,331 | Wallis | Feb. 25, 1958 |